United States Patent [19]

Ermacora et al.

[11] Patent Number: 4,719,742
[45] Date of Patent: Jan. 19, 1988

[54] MOWING MACHINE

[75] Inventors: Rino Ermacora, Ottersthal; Anton Werner, Saverne, both of France

[73] Assignee: Kuhn S.A., Saverne, France

[21] Appl. No.: 21,757

[22] Filed: Mar. 4, 1987

Related U.S. Application Data

[63] Continuation of Ser. No. 716,174, Mar. 26, 1985, abandoned.

[30] Foreign Application Priority Data

Apr. 12, 1984 [FR] France ................. 84 05955

[51] Int. Cl.$^4$ ................ A01D 34/66; A01D 43/10
[52] U.S. Cl. ...................... 56/16.4; 56/13.6; 56/218
[58] Field of Search ............ 56/13.6, 16.4, 17.4, 56/192, 218, 228

[56] References Cited

U.S. PATENT DOCUMENTS

| | | | |
|---|---|---|---|
| 2,625,784 | 1/1953 | Kelsey | 56/192 |
| 2,753,674 | 7/1956 | Cunningham, Jr. et al. | 56/13.6 X |
| 3,221,484 | 12/1965 | van der Lely | 56/192 X |
| 3,699,752 | 10/1972 | Dandl | 56/13.6 |
| 3,893,283 | 7/1975 | Dandl | 56/13.6 X |
| 4,099,364 | 7/1978 | Kanengieter et al. | 56/192 X |
| 4,196,567 | 4/1980 | Davis et al. | 56/16.4 X |
| 4,211,287 | 7/1980 | Garrison . | |
| 4,428,181 | 1/1984 | van Staveren et al. | 56/13.6 |
| 4,473,993 | 10/1984 | Jennings et al. | 56/192 X |

FOREIGN PATENT DOCUMENTS

| | | |
|---|---|---|
| 0060600 | 9/1982 | European Pat. Off. . |
| 2757211 | 6/1978 | Fed. Rep. of Germany ....... 56/13.6 |
| 1559242 | 3/1969 | France . |
| 2110911 | 6/1972 | France . |
| 2294625 | 7/1976 | France . |
| 7712243 | 4/1977 | France . |
| 2342018 | 9/1977 | France . |
| 2386247 | 11/1978 | France . |
| 11307 | 7/1972 | Hungary . |
| 610600 | 10/1948 | United Kingdom . |
| 1201938 | 8/1970 | United Kingdom . |
| 1253441 | 11/1971 | United Kingdom . |

*Primary Examiner*—Carlton R. Croyle
*Assistant Examiner*—Paul F. Neils
*Attorney, Agent, or Firm*—Marmorek, Guttman & Rubenstein

[57] ABSTRACT

A mowing machine having cutting elements and a beam for attaching to a tractor, and an intermediate structure to which is connected the beam, the cutting elements comprising a first and a second cutting group each group extending on the opposite side of the intermediate structure. The cutting groups are removably mounted on the intermediate structure and optionally are associated with conditioning members for further handling harvested produce.

40 Claims, 9 Drawing Figures

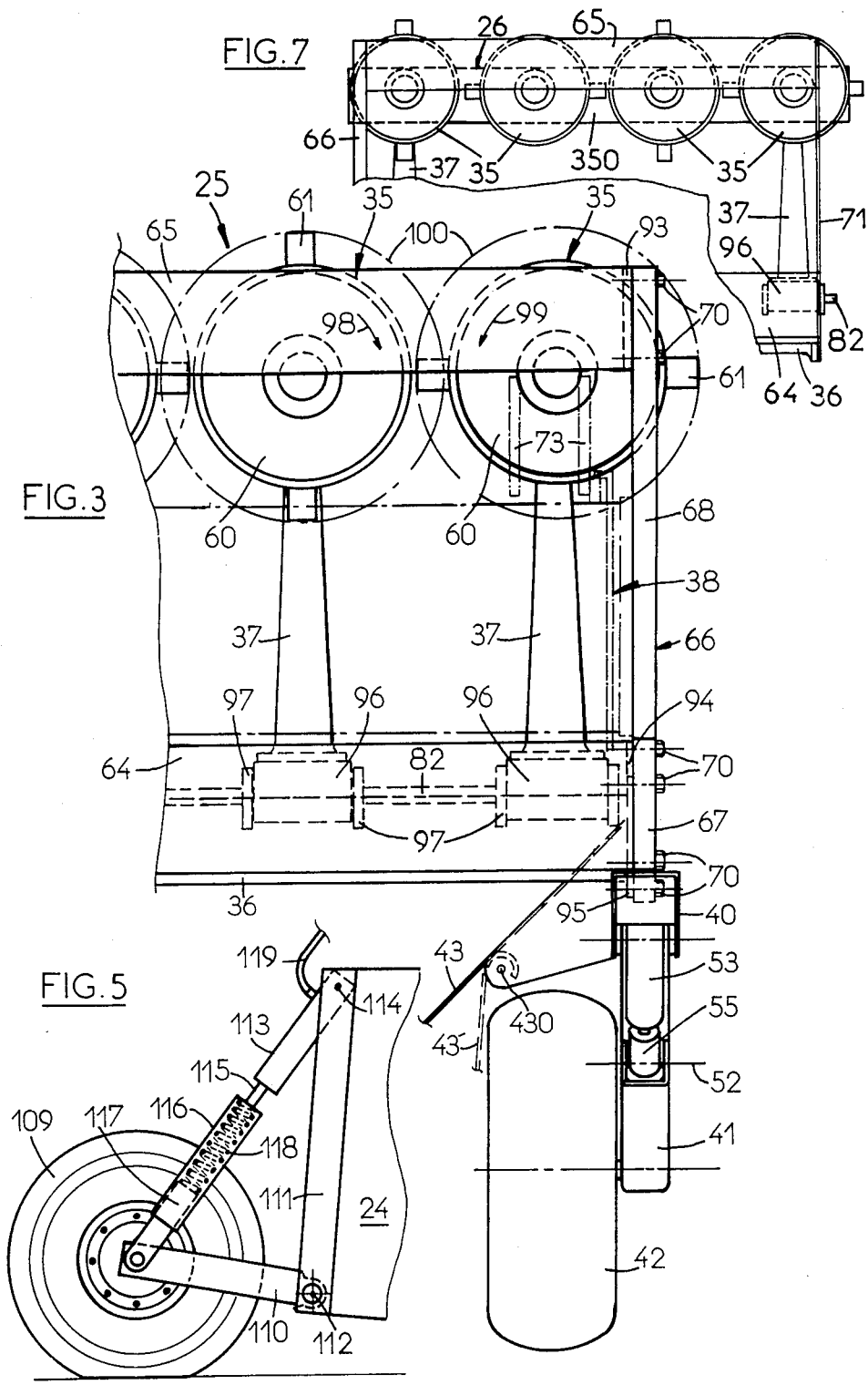

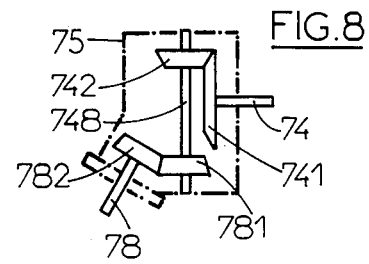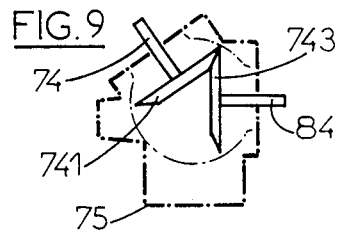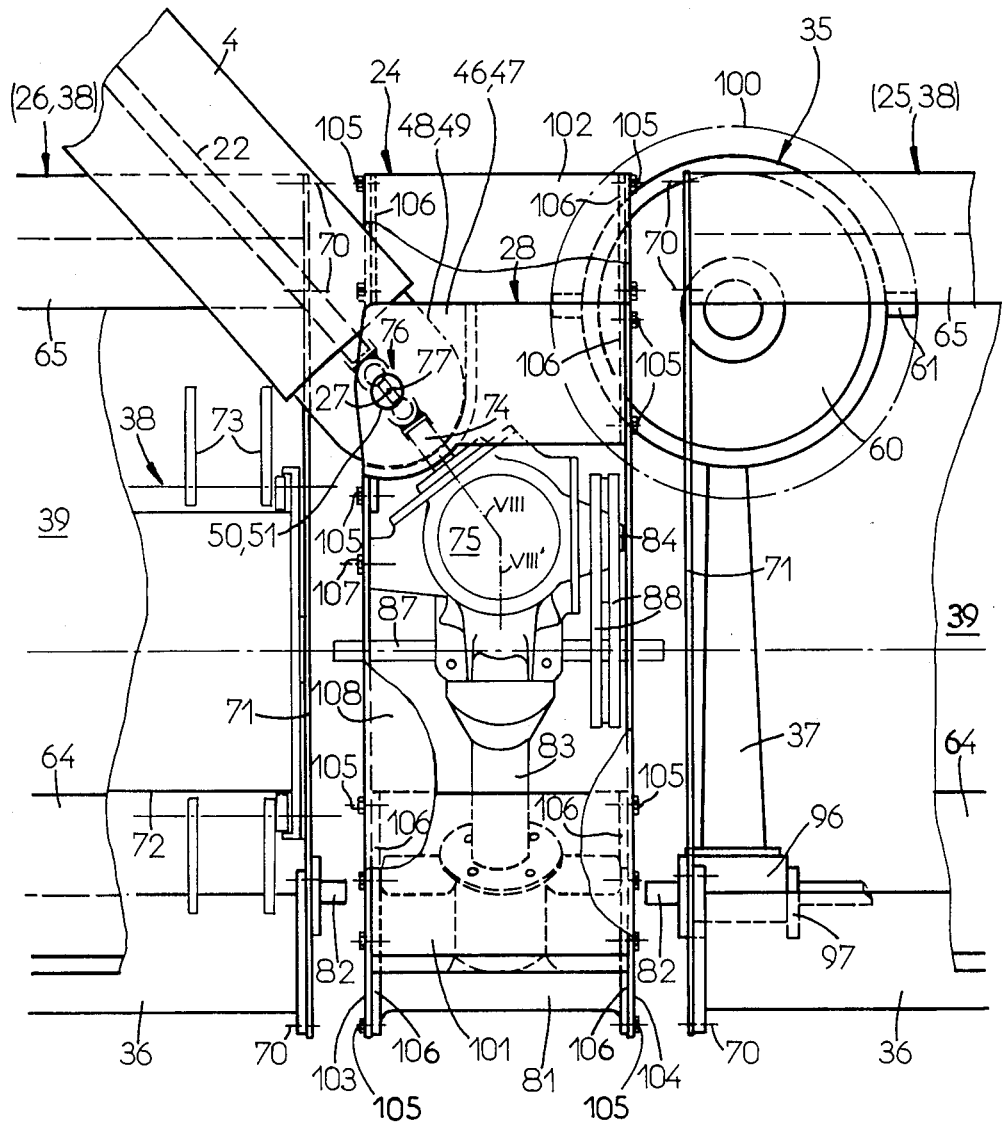

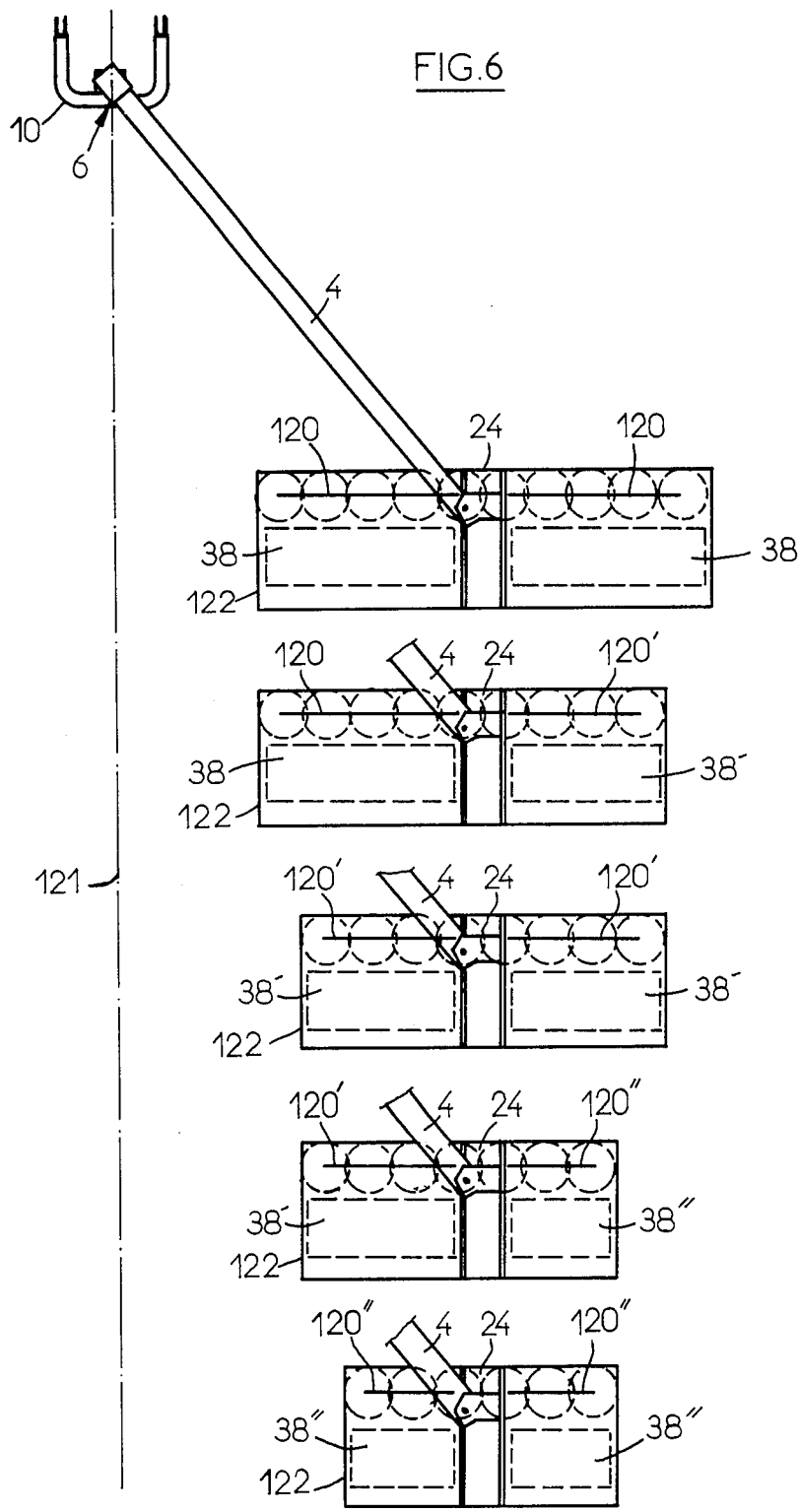

MOWING MACHINE

This is a continuation of application Ser. No. 716,174, filed Mar. 26, 1985, now abandoned.

BACKGROUND OF THE INVENTION

Field of the Invention

The present invention is concerned with reapers and mowing machines comprising a cutting group and a beam allowing their connection to a tractor.

This type of machine is designed for large working areas so that its structure generally is relatively voluminous. The size of this structure increases correlatively with the working area of the machines. It will be understood then that the fabrication, the storage, and the transportation of such machines are not without problems.

Additionally, the construction of the present machines is made in such a way that each machine corresponds to a well defined working area. This means that it is possible to employ only a few elements of one machine having a certain working area in order to make a machine having a different working area. The result therefore is a certain lack of flexibility in manufacture which translates itself into high production costs.

SUMMARY OF THE INVENTION

The present invention has for its object to remedy the drawbacks of prior art machines.

This object is achieved by a measure where the mower comprises an intermediate structure which is connected to its beam, and a second cutting group in such a way that a first cutting group extends on one side of the intermediate structure and the second cutting group on the other side of the said intermediate structure, said cutting groups being removably secured on said intermediate structure.

This characteristic of the invention affords numerous advantages. In fact owing to the modular construction according to the invention, it is possible to construct mowers having a large cutting area whose fabrication does not require large areas neither during assembly nor for example at the time they are painted. This results from the fact that the size of the cutting groups remains relatively small. Similarly, the storage of the machines also does not require large areas because the cutting groups, the intermediate structure and the beam can be placed in such a way that they can occupy the least amount of space possible, for example by placing them in a case. This reduced volume of the machine is also very advantageous for its transportation since the transportation costs can be considerably reduced.

Since the beam is connected to the intermediate structure, the traction force necessary to pull the mower is very well supported by the body of the mower.

Moreover, there is obtained a better distribution of stresses on the beam-intermediate structure linkage because the point of attachment of the beam is located between the free ends of the body of the mowing machine.

According to an additional characteristic of the invention, the cutting groups can be equipped with conditioning means.

The invention is of great interest in this type of machine which is called a mower-conditioner, because the conditioning means generally increase substantially the size of the cutting groups, and therefore of the entire machine.

According to other characteristics of the invention, the cutting groups or the conditioning-cutting groups can have the same or different lengths.

It is therefore possible owing to this characteristic of the invention, to provide a large range of mowers or of mower-conditioners which have different working areas, while manufacturing only a limited number of cutting groups and conditioning means for different working areas.

In fact by combining these different widths of cutting groups and conditioning means which are mounted on the intermediate structure, there are obtained different total working areas. This improved efficiency in manufacture lowers production costs and provides a great flexibility in order to rapidly fulfill the demands of users at a given time.

According to another characteristic of the invention, the intermediate structure has two lateral surfaces, and the cutting groups or the cutting-conditioning groups extend each near one of these lateral surfaces.

This characteristic of the invention makes it possible to properly integrate the intermediate structure in the general volume of the machine which is to a great extent defined by the cutting groups or the cutting-conditioning groups. This ensures that the intermediate structure does not interfere with the work effected by the cutting groups or the conditioning-cutting groups.

Advantageously, the connection between the beam and the intermediate structure is effected by means of an articulation whose axis is upwardly directed. This makes it possible to bring the beam into various working positions and into one transport position.

According to another characteristic of the invention, the intermediate structure supports the entrance housing of the machine which receives the movement from the tractor through the intermediary of transmission means, and which then distributes this motion to the cutting groups or to the cutting-conditioning groups.

This characteristic further reinforces the modular nature of the mower or of the mower-conditioner of the invention in so far as the intermediate structure, the beam and the entrance housing assembly forms a basic unit which can be common to a range of mowers or of mower-conditioners.

Advantageously, this basic unit can moreover support the one or the several distribution housings which distribute motion from the output of the entrance housing to the different working members.

It should additionally be noted that the intermediate structure can to a great extent for example be constituted by the entrance housing itself and optionally by one or several of said distribution housings.

BRIEF DESCRIPTION OF THE DRAWINGS

Further characteristics and advantages of the invention will appear hereinafter in greater detail in the following description of a non-limiting example of the invention, reference being had to the accompanying drawing in which:

FIG. 3 is a partial cross-section seen in plan view of one end of the body of the mower-conditioner of FIG. 1;

FIG. 4 is a partial cross-section seen in plan view of the middle of the body of the mower-conditioner of FIG. 1;

FIG. 5 is a lateral partial view of a modification of the intermediate structure of a cutting machine of the invention;

FIG. 6 shows a series of mower-conditioners made according to the invention;

FIG. 7 is a partial plan view of the body of the mower-conditioner of FIG. 1 equipped with a modified cutting group;

FIG. 8 shows schematically the arrangement of the transmission means in the entrance housing which connect the entrance shaft to a first outlet shaft; and FIG. 9 shows schematically the arrangement of the transmission means in the entrance housing which connect the entrance shaft to a second outlet shaft.

DESCRIPTION OF THE BEST MODES OF THE INVENTION

Figure 1:
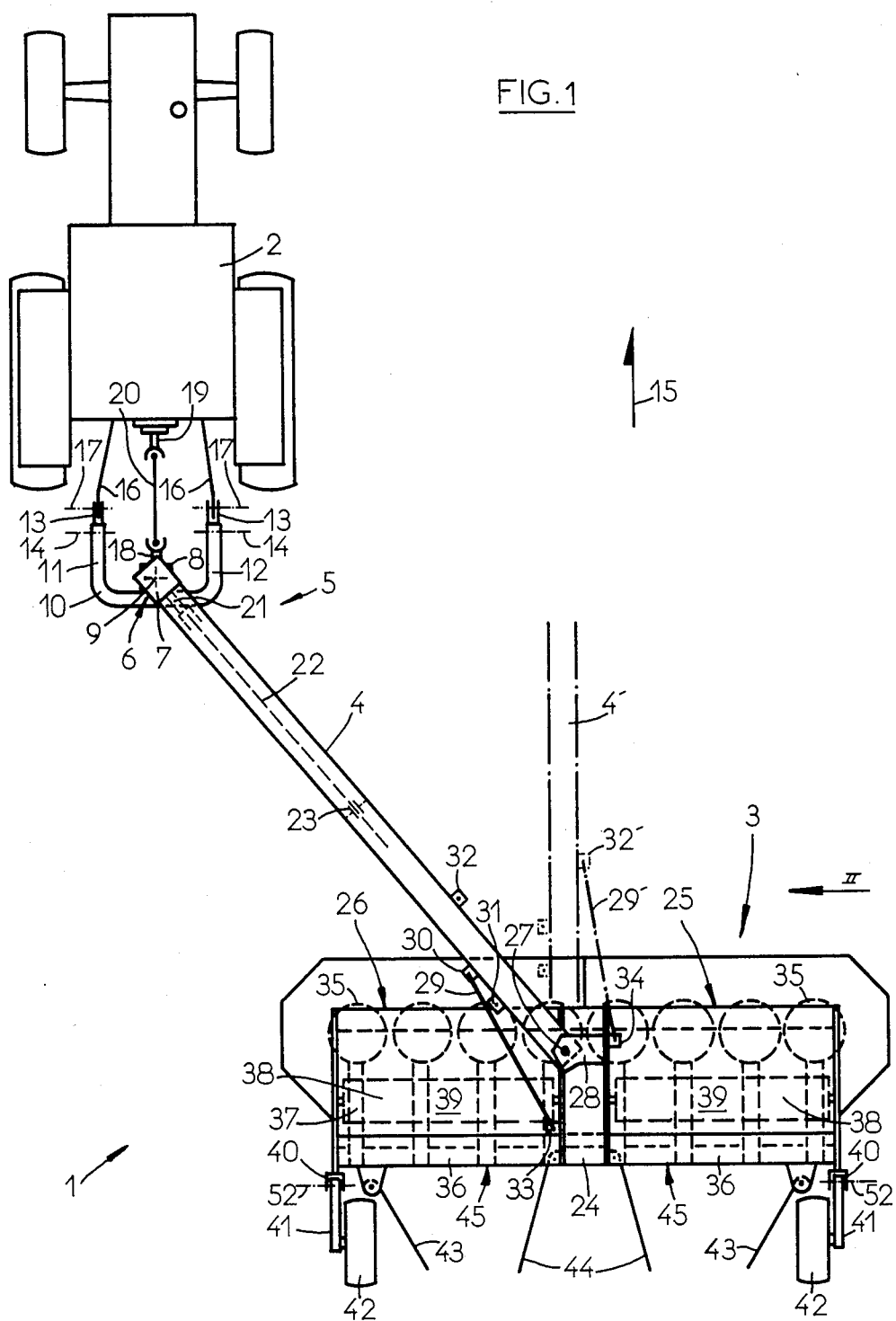
FIG. 1 is a plan view of the mower-conditioner according to the invention coupled to a tractor.

FIG. 1 shows a mower 1 according to the invention coupled to a tractor 2. The mower 1 is composed of a body 3 and a beam 4. At its front part 5, the beam 4 is equipped with a transmission device 6 known to those skilled in the art. This transmission device 6 comprises an upper housing 7 and a lower housing 8 which can turn one with respect to the other about an upwardly directed shaft 9. The device 6 additionally comprises a frame 10 rotatably connected to the lower housing 8. Frame 10 comprises at the free extremity of each of its branches 11, 12, a yoke 13 connected to frame 10 by means of a pivot. The pivots of the two yokes 13 have a common axis 14 which is substantially horizontal and which extends transversally to the direction of advance 15 of the assembly mower 1 tractor 2. Each yoke 13 is besides connected to the lower arm 16 of tractor 2 by means of an articulation. These two articulations have a common axis 17 which is substantially horizontal and extends transversally to the direction of advance 15. The lower housing 8 supports at least one input shaft 18 which is connected to the power take off shaft 19 of the tractor 2 by means of a shaft with universal joints 20, while the upper housing 7 supports an outlet shaft 21. Inside transmission device 6, the one or the several entry shafts 18 are connected to the outlet shaft 21 by means of transmission means known to those skilled in the art.

The outlet shaft 21 transmits motion to the active members of mower 1 through the intermediary of a transmission shaft 22 rotatably connected to said outlet shaft 21. Preferably, the transmission shaft 22 is housed inside beam 4. Owing to the considerable length of transmission shaft 22, the same is held to beam 4 by means of at least one bearing 23.

With the transmission device 6, the mower 1 can follow the contour of the soil independently of tractor 2 owing to the pivoting of yokes 13 respectively about axes 14 and 17. Besides the assembly of the lower housing 8 and of the frame 10 can pivot relatively to the upper housing 7 about axis 9. In this fashion, tractor 2 can move along tight curves without submitting the shaft with universal joints 20, the transmission members housed inside the device 6 and the transmission shaft 22 to additional stresses.

The body 3 of mower 1 is constituted by three principal sub-assemblies: an intermediate structure 24 and two cutting groups 25, 26 located respectively on either side of said intermediate structure 24.

At its back extremity, beam 4 is connected to intermediate structure 24 by means of a pivot whose shaft and axis 27 is directed upwardly. To this effect, the intermediate structure 24 comprises a yoke 28.

With this pivoting arrangement, beam 4 can move relatively to intermediate structure 24 in such a way that it can assume different positions relative to said intermediate structure 24. In FIG. 1, the beam 4 as shown by heavy lines is in a work position while as shown by dots and dashes, it is for example in a transport position.

The position of beam 4 relative to the intermediate structure 24 is determined by suitable means such as for example a tie rod 29 which collaborates with legs 30, 31, 32 integral with beam 4, and legs 33, 34 integral with intermediate structure 24. Thus, in non-limiting fashion, beam 4 can for example occupy two work positions when the tie rod 29 collaborates with leg 33 and leg 30 or 31 and a transport position when the said tie rod collaborates with leg 34 and leg 32 being in position 32'.

Each cutting group 25, 26 has in non-limiting fashion four cutting heads 35 which are each connected to a support 36 by means of an arm 37. It is also perfectly possible within the scope of the invention that several cutting heads 35 of the same cutting group 25 or 26 be mutually connected for example by means of a housing 350 which supports said cutting heads and which has means for driving these (see FIG. 7). In FIG. 1, it is seen that each cutting group additionally comprises conditioning means 38.

The assembly of cutting heads 35 and conditioning means 38 thus forms what is called a cutting-conditioning group.

Each cutting-conditioning group (25, 38) and (26, 38) extends under a hood 39. Behind its free extremity, each cutter-conditioner group (25, 38) and (26, 38) comprises a link 40 or yoke in which is articulated an arm 41 at the free end of which is fixed a wheel 42. With these articulations, the position of each wheel 42 can be modified with respect to the cutting-conditioning group (25, 38) and (26, 38) corresponding thereto. This makes it possible to maintain the cutting-conditioner groups (25, 38) and (26, 38) near the ground during work and away from the ground when cutting must be interrupted or during transportation of the machine. Each cutting-conditioning group (25, 38) and (26, 38) additionally has at its rear part swath devices (43, 44) whose position preferably is adjustable relative to the exit opening 45 from which issues the product harvested (see FIG. 3). This adjustment of the swath devices (43, 44) makes possible the calibration of the swath of harvested hay or grass.

Each cutting-conditioning group (25, 38) and (26, 38) thus constitutes a unit which is mounted removably on intermediate structure 24 by means of a suitable arrangement which will be described later.

The assembly thus mounted and formed by the intermediate structure 24 and the cutting-conditioning groups (25, 38) and (26, 38) constitutes the body 3 of the machine which is in this case of the type called a mower- or reaper-conditioner. The body 3 of this machine rolls on the ground with the aid of wheels 42. The rotational driving of cutting heads 35 and of the conditioning members 38 is produced by transmission shaft 22 and a transmission mechanism housed in the body 3 of the machine and which will be described later.

Figure 2:
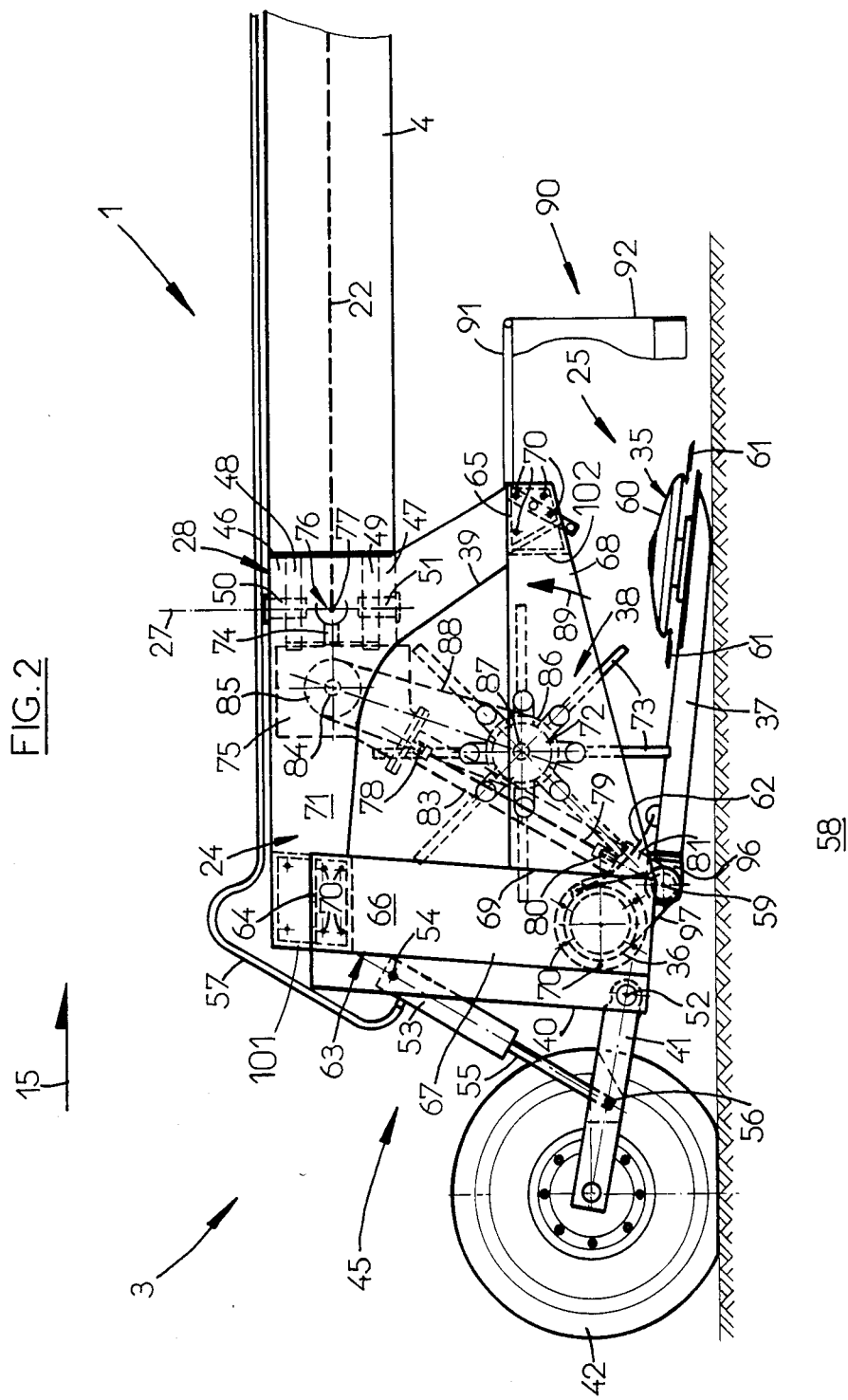
FIG. 2 is a lateral view of the body of the mower-conditioner of FIG. 1.

In FIG. 2 appears a side view of the body 3 of the machine 1. There is seen the intermediate structure 24 and the cutting-conditioning group (25, 38). In front of the intermediate structure 24 is located the yoke 28 which comprises two wings (46, 47). The beam 4 has two legs (48, 49) which extend between the wings (46, 47) of the yoke 28 and are connected thereto by means of two pivots (50, 51) which define the pivoting axis 27 of the beam with respect to the intermediate structure 24.

In FIG. 2, is shown also wheel 42 connected to the cutting-conditioning group (25, 38) by means of arm 41. The end of arm 41 remote from wheel 42 penetrates in the yoke 40 which extends along the rear wall of the cutting-conditioning group and is connected thereto by means of articulation 52. In the upper part of the yoke 40 is connected the cylinder 53 of a jack through articulation 54 while rod 55 of the jack is connected to arm 41 by means of articulation 56. The jack (53, 55) is actuated, for example, by the hydraulic system of tractor 2 whose oil is conveyed by a conduit 57. Thus when the hydraulic system of tractor 2 pushes back oil into cylinder 53 of the jack, the length of the jack increases, which moves the body 3 of the machine away from the soil 58. In parallel fashion, the cutting heads 35 also move away from the soil 58. The ascent of the cutting heads 35 takes place with a slight delay. In effect, each cutting head 35 is mounted on support 36 in such a way as to pivot about an axis 59 substantially horizontal and extending transversally to the direction of advance 15 of the mower. (If, as above stated, several cutting heads 35 are mutually connected and this assembly, for example, is fixed to support 36 by means of at least one arm 37, it will be the entire assembly which will pivot about axis 59.) This possible pivoting of the cutting head 35 and of its arm 37 enables the cutting head 35 which is composed of a rotary disk 60 equipped with at least one cutting element 61 to adapt itself to unevenness on the ground 58 on which operates the machine. The pivoting of the cutting head downwardly is limited by means of a traction element 62 which is connected respectively to support 36 and to arm 37. Thus the ascent of cutting head 35 will take place when traction element 62 is under tension. It should be noted that in work position, the traction element 62 does not interfere with the movements of cutting head 35 which can follow irregularities on the ground, except if the cutting head 35 encounters a hole which is very deep.

As seen in FIG. 2, the frame 63 of the cutting-conditioning group (25, 38) comprises two struts, an upper strut 64 and a front strut 65 and the support 36 which also serves as a strut for frame 63 in addition to its function of support for cutting heads 35. The distance between the struts (64, 65) and the support 36 is maintained by lateral walls. The lateral wall 66 located at the outer end of the cutting-conditioning group is constituted by a substantially vertical branch 67 and a substantially horizontal branch 68 which are mutually connected for example by welding along line 69. The lateral wall thus formed is fixed on the extremity of struts (64, 65) and support 36 by suitable means such as for example bolts 70. On the side of the intermediate structure 24, the struts (64, 65) and support 36 are also fixed on the lateral wall 71 by suitable means such as for example bolts.

The upper opening of frame 63 thus formed is closed by cover 39. Under this cover 39 extends the conditioning means 38 which consists in the example of a rotor having a central tube 72 on which are articulated fingers 73. The free end of fingers 73 extend near arms 37. The rotor (72, 73) is rotationally guided in bearings not shown but which are well known to those skilled in the art and which are fixed on the lateral walls (66, 71).

The rotational movement of the rotary members of the machine takes place by means of transmission shaft 22 which receives motion from the tractor as above explained. This transmission shaft 22 is rotationally connected to the entrance shaft 74 of an entrance housing 75 by means of a universal joint 76 which is preferably homokinetic. The center 77 of universal joint 76 preferably is located substantially on axis 27 about which can pivot beam 4 with respect to intermediate structure 24. This affords advantages when the beam can assume several work positions. The entrance housing 75 comprises an outlet shaft 78 which extends from the lower part of said housing 75 downwardly and towards the rear. The transmission members extending inside the entrance housing 75 and which connect entrance shaft 74 to the outlet shaft 78 are shown schematically on FIG. 8 which shows a cross-section of the entrance housing 75 along the lines VIII, VIII' (FIG. 4). These members consist of a first couple of gears (741, 742) which transmits motion from entrance shaft 74 to an intermediate shaft 748 rotationally guided in entrance housing 75. A second couple of gears (781, 782) transmits motion from the intermediate shaft 748 to outlet shaft 78. The outlet shaft 78 is rotationally linked with a driving shaft 79 which is itself rotationally linked with the entry shaft 80 of a distribution housing 81. The distribution housing 81 then distributes laterally motion to a shaft 82 (FIGS. 3, 4 and 7) centered on axis 59 around which can pivot cutting heads 35. Inside the transmission housing 81 are positioned transmission means which are known to those skilled in the art. Similarly, rotational driving of disk 60 of each cutting head 35 is also within the skill of the art. The entrance housing 75 and the distribution housing 81 are mutually connected by a tube 83 which is fixed thereto respectively by means of for example bolts.

The entrance housing 75 also has another outlet shaft 84 which is substantially horizontal and extends transversally to the direction 15. The transmission means extending inside of the entrance housing 75 and which connect the entrance shaft 74 to the outlet shaft 84 are represented schematically on FIG. 9. These members are composed by a pair of gears (741, 743) which transmit movement from entrance shaft 74 to outlet shaft 84. The outlet shaft 84 has a wheel 85 which is rotationally connected thereto. This wheel 85 drives a wheel 86 keyed on shaft 87 of rotor (72, 73) through for example at least one chain 88 in such a way that the rotor (72, 73) is rotated in the direction indicated by arrow 89. The fingers of rotor (72, 73) thus can grip the product cut by cutting elements 61 during the rotation of disks (60) and make it pass in the channel formed by rotor (72, 73) and cover 39. The combined action of fingers 73 of rotor (72, 73) and rubbing on the inner surface of cover 39 conditions the harvested product which is than ejected through the rear outlet 45 of the machine to be deposited on the soil where it will dry before being picked up.

The swath devices (43, 44) seen on FIG. 1 have not been represented in FIG. 2 in order not to overload this Figure.

In FIG. 2, there is also shown a protecting device 90 which is composed of a support frame 91 supporting along its free edge a wall 92 preferably made of flexible material. The support frame 91 is mounted on the frame 63 of the cutting-conditioning group, preferably by means of an articulation which makes it possible to pivot it for example to facilitate the access to cutting heads 35 or rotor (72, 73). The function of this protection device 90 consists in breaking or stopping projection of foreign bodies which might hurt someone near the machine.

In FIG. 3, there is seen the outer end of the cutting-conditioning group (25, 38). (The cover 39 is shown removed to facilitate consideration of the Figure). There is seen in particular the assembly of the outer lateral wall 66 on the struts (64, 65) and on the support 36. To this effect, the struts (64, 65) and the support 36 which are preferably tubular, comprise flanges (93, 94, 95). These flanges are welded on the ends of struts (64, 65) and of support 36 and comprise a certain number of threaded holes in which are screwed bolts 70.

In this Figure, is also seen the driving shaft 82 which transmits motion from the distribution housing 81 to the different cutting heads 35. This shaft 82 passes through a housing 96 fixed to each arm 37. The housings 96 are supported by support 36 by means of legs 97 which allow pivoting of said housings 96 about the longitudinal axis of shaft 82. The disks 60 preferably are driven two by two in opposite directions as shown by arrows (98, 99). However, the scope of the invention will not be avoided if the disks are driven in the same direction. This driving of disks 60 is synchronous and cutting elements 61 of two neighboring disks 60 are angularly dephased which allows an overlap of their extreme trajectory (100). Also seen in FIG. 3 is the swath device 43. The latter is composed by an adjustable sheet between position 43 and position 43'. Adjustment of sheet 43 takes place about an upwardly directed axis (430). It should be noted that adjustment of the position of the swath device 44 can take place in the same way as that of sheet 43.

In FIGS. 2 and 3 is shown the structure of the cutting-conditioning group (25, 38). It should also be noted that this description is also applicable for the cutting-conditioning group (26, 38) which comprises to a great extent the same members as the cutting-conditioning group (25, 38).

In FIG. 4, is seen the central part of body 3 of the mower-conditioner. The cutting-conditioning groups (25, 38) and (26, 38) have been separated from the intermediate structure 24 to explain the manner of assembling said body 3 of the machine.

The intermediate structure 24 is composed of essentially two cross pieces (101, 102) of distribution housing 81, and of yoke 28 which also serves as a cross piece. The distance between cross pieces (101, 102), the distribution housing 81 and the yoke 28 is maintained by means of two lateral plates (103, 104) which are fixed thereto by means of for example screws 105. To this effect, the ends of cross pieces (101, 102), the yoke 28 and the distribution housing 81 comprise flanges 106 in which are made a certain number of threaded holes for screws 105. The structure thus formed moreover supports the entrance housing 75 which is fixed on the one hand on the distribution housing 81 by means of cross piece tube 83, as above stated, and on the other hand on the lateral plate 103 by means of screws 107. The openings which remain on the structure are closed by a cover sheet 108.

The intermediate structure thus constituted forms an autonomous unit on which are then easily and removably mounted the beam 4 and the cutting-conditioning groups (25, 38) and (26, 38). Assembly is effected by bringing together the cutting-conditioning groups and the intermediate structure 24 until the lateral walls 71 touch the lateral plates (103, 104). These are then tightened by means of screws. By bringing the cutting-conditioning groups and the intermediate structure 24, near one another, the driving members which rotate rotors (72, 73) and the cutting heads 35 are also coupled. To explain this coupling, there is shown in FIG. 4 the rotor (72, 73) of the cutting-conditioning group (26, 38) and the extreme inner cutting head 35 of the cutting-conditioning group (25, 38) it being understood that coupling of the rotor (72, 73) of the cutting-conditioning group (25, 38) and of the extreme inner cutting head 35 of the cutting conditioning group (26, 38) will take place in the same manner. In order to do so, it is seen that shaft 87 passes on either side of the lateral plates (103, 104) of the intermediate structure 24 which comprises for this purpose suitable openings. Similarly, it is seen that shaft 82 which drives cutting heads 35 passes beyond lateral walls 71. By bringing together therefore the cutting-conditioning groups and the intermediate structure 24, there is obtained a coupling on one hand of shaft 87 with rotors (72, 73) and on the other hand of shafts 82 with the driving members housed in distribution housing 81. To this effect, the ends of shaft 87 and the bores provided at the ends of rotors (72, 73) as well as the ends of shafts 82 and the bores provided in the driving members housed in the distribution housing 81 have suitable shapes which allow their rotatable connection.

It should be noted that within the scope of the invention, it is possible to eliminate lateral plates (103, 104) of the intermediate structure 24. In this case, the cross pieces (101, 102), the distribution housing 81 and the yoke 28 will be directly and removably fixed on the lateral walls 71 of the cutting-conditioning groups (25, 38) and (26, 38). Similarly, the input housing 75 will be also fixed on at least one lateral wall 71. The coupling of shaft 87 with the rotors (72, 73) and shafts 82 with the distribution housing will take place in a manner similar to that above-described.

In FIG. 5, there is seen an additional wheel 109 which is mounted on intermediate structure 24. The function of this additional wheel is to limit the sag of body 3 when the same is too wide. Wheel 109 is fixed to the free extremity of an arm 110. At its other extremity, arm 110 is pivoted on a yoke 111 about a shaft and axis 112. Preferably, axis 112 coincides with axis 52 about which are articulated wheels 42. The yoke 111 extends along the rear wall of intermediate structure 24. In the upper part of yoke 111, is connected cylinder 113 of a jack by means of an articulation 114, while the rod 115 of the jack is connected to a tube (116). The tube 116 is open at its lower part. In this opening penetrates a piston 117 after introduction of a spring 118. The other end of piston 117 is articulated on the arm 110. In its upper part, cylinder 113 is connected to a conduit 119 which is connected with the hydraulic system of the tractor.

As shown, wheel 109 is in work position. Thanks to spring 118, the wheel 109 can pivot upwardly within certain limits around articulation 112, even if jack (113, 115) is hydraulically locked. The function of this possible pivoting is to ensure that the wheels 42 located at each end of body 3, always remain in contact with the ground 58 regardless of the topography of the ground, while limiting the sag of body 3 of the mower between its outer extremities.

When the body 3 of the mower must be raised, oil is brought in the jack by conduit 119. Simultaneously, oil is also brought into jacks (53, 55) by the conduits 57.

When the body 3 is in raised position, the wheel 109 can as in its lowered position, pivot upwardly within certain limits about the articulation 112 against spring 118.

Naturally, the scope of the invention will not be avoided if instead of a wheel 109, the machine is provided with several additional wheels. Moreover, instead of being fixed on the intermediate structure 24, these wheels can be fixed at the inner end of the cutting-conditioning groups (25, 38) and (26, 38). It will be possible also to use another flexible means instead of spring 118.

In FIG. 6 is shown the modular nature of a construction of the mower according to the invention and the efficiency resulting therefrom in manufacture. To this effect with the aid of FIG. 6, it is seen for example that with three widths of cutting groups (120, 120' and 120") and three widths of conditioning means (38, 38' and 38") it is possible to provide a range of five mower-conditioners having different working areas, or widths, the intermediate structure 24, the beam 4 and the transmission device 6 remaining the same for the five machines.

This is also true for other parts such as the struts (64, 65) or the supports 36 or again the shafts 82. This list of parts naturally is not complete. It is seen therefore immediately that the production of this series of mower-conditioners is much simplified. Similarly, productivity is considerably increased bearing in mind the reduced number of different parts to be made.

The increase in the series fabrication of these parts resulting therefrom thus makes it in general possible to considerably reduce production costs.

In FIG. 6, it seen that the distance between the longitudinal axis 121 of the tractor and the free inner end 122 of body 3 of the different mowers increases if the beam 4 remains in the position shown. But as above-described, beam 4 can occupy several working positions in such a way that said distance between axis 121 and the inner free end 122 of body 3 of the machines can be maintained substantially constant or at least its increase can be limited.

Various changes modifications or improvements can be made in the above-described example without thereby departing from the present invention.

In particular, it is evident that the invention is not limited to a mower-conditioner but is also applicable to a mower which does not have a conditioning system.

What is claimed is:

1. A mowing machine comprising
a body,
two cutting groups on said body, said cutting groups each comprising a frame and cutting means supported by said frame,
an intermediate structure on said body, said first cutting group extending on one side of said intermediate structure, and said second cutting group extending on the other side of said intermediate structure, said frames of said first and said second cutting groups being rigidly and removably secured to said intermediate structure,
a beam for connecting said mowing machine to a tractor, said beam being connected to said intermediate structure, so as to be pivotable about an upwardly directed axis,
positioning means operable to determine the position of said beam with respect to said body,
supporting wheels on said body for supporting said body on the ground at least during working of said mowing machine, said supporting wheels extending at the rear of said body and being movable in respect to said body,
maneuvering means operable to modify and to determine the position of said supporting wheels with respect to said body, and
driving means for driving said cutting means of said first and said second cutting groups.

2. A mower according to claim 1, wherein said first cutting group has the same length as said second cutting group.

3. A mower according to claim 1, wherein said first cutting group has a different length than said second cutting group.

4. A mower according to claim 1, wherein said intermediate structure comprises two lateral surfaces, said two cutting groups each extending near said lateral surfaces.

5. A mower according to claim 1, wherein said beam is arranged so as to pivot between at least one work position and a transport position.

6. A mower according to claim 1, wherein said beam is arranged to occupy various working positions.

7. A mower according to claim 1, wherein the cutting means of each of said cutting groups are supported by the respective frame by at least one arm.

8. A mower according to claim 1, wherein said maneuvering means includes jacks.

9. A mower according to claim 1, further including swath means associated with each cutting group, said swath means being preferably adjustable about an upwardly extending axis.

10. A mower according to claim 1, wherein said frame of each of said cutting groups comprises a plurality of struts, and at least one lateral wall maintaining said struts apart from each other.

11. A mower according to claim 10, wherein at least one of said lateral walls is removably fixed on said struts.

12. A mower according to claim 1, wherein the cutting means of each of said cutting groups are supported by their respective frame in such a way as to move upwardly and downwardly with respect to said frame.

13. A mower according to claim 12 wherein each of said cutting groups comprises a plurality of cutting means arranged to move conjointly with respect to the respective frame.

14. A mower according to claim 12, wherein said upward and downward movement of said cutting means with respect to said frame is a pivoting movement about an axis which is substantially horizontal and which extends transversely to the direction of advance of said mower.

15. A mower according to claim 1, wherein said intermediate structure supports at least part of said driving means.

16. A mower according to claim 15, wherein at least part of said driving means couple with said cutting groups during assembly of said cutting groups on said intermediate structure.

17. A mower according to claim 15, wherein each of said cutting groups has a shaft passing through the lateral surface of said cutting groups.

18. A mower according to claim 1, further including conditioning means associated with said cutting groups, said driving means also driving said conditioning means.

19. A mower according to claim 18, wherein said intermediate structure supports at least part of said driving means.

20. A mower according to claim 19, wherein first conditioning means are associated with said first cutting group to form a first cutting-conditioning group, and second conditioning means are associated with said second cutting group to form a second cutting-conditioning group, and wherein at least part of said driving means couple with said cutting-conditioning groups during assembly of said cutting-conditioning groups on said intermediate structure.

21. A mower according to claim 19, wherein at least part of said driving means for said conditioning means comprises a shaft, said shaft having two extremities issuing from the lateral surfaces of said intermediate structure.

22. A mower according to claim 1, wherein said intermediate structure comprises a number of cross pieces.

23. A mower according to claim 22, wherein said intermediate structure supports an entrance housing and/or at least one distribution housing, said entrance housing and/or said distribution housing constituting cross pieces of said intermediate structure.

24. A mower according to claim 22, further including at least one lateral plate for maintaining said cross pieces at a desired distance from one another.

25. A mower according to claim 24, wherein said lateral plate is removably secured on said cross pieces.

26. A mower according to claim 1, wherein two supporting wheels are utilized.

27. A mower according to claim 26, wherein a wheel extends near the rear of a free extremity of each cutting group.

28. A mower according to claim 26, further including at least one additional wheel, said additional wheel being positioned between said first wheels.

29. A mower according to claim 28, wherein said additional wheel is mounted to pivot relative to the body of said mower, and against a resilient member.

30. A mower according to claim 28, wherein said additional wheel is fixed on said intermediate structure.

31. A mower according to claim 28, wherein said first wheels pivot about a first axis and said additional wheel pivots about a second axis, said axes being substantially coincident.

32. A mower according to claim 1, wheren said driving means includes an entrance housing supported by said intermediate structure.

33. A mower according to claim 32, wherein said driving means further includes a coupling and means for transmitting motion from the front of said beam to said entrance housing, whereby the axis of said coupling is substantially coincident with the axis about which said beam pivots with respect to said intermediate structure.

34. A mower according to claim 33, wherein said transmitting means consist of at least one shaft which is coupled to an entrance shaft of said entrance housing by means of a universal joint.

35. A mower according to claim 34, wherein said universal joint is homokinetic.

36. A mower according to claim 32, wherein said driving means further includes at least one distribution housing, said distribution housing being supported by said intermediate structure.

37. A mower according to claim 36, wherein said distribution housing is located below said entrance housing, transmitting members connecting said two housings.

38. A mower according to claim 37, wherein said distribution housing is located behind said entrance housing.

39. A mower according to claim 36, wherein said entrance housing and said distribution housing are rigidly connected by means of a cross tube, transmitting members connecting said two housings.

40. A mower according to claim 39, wherein said transmitting members extends inside said cross tube.

* * * * *